P. H. HENDRICKSON.
WAGON STEERING GEAR.
APPLICATION FILED NOV. 6, 1913.
1,109,752.
Patented Sept. 8, 1914.
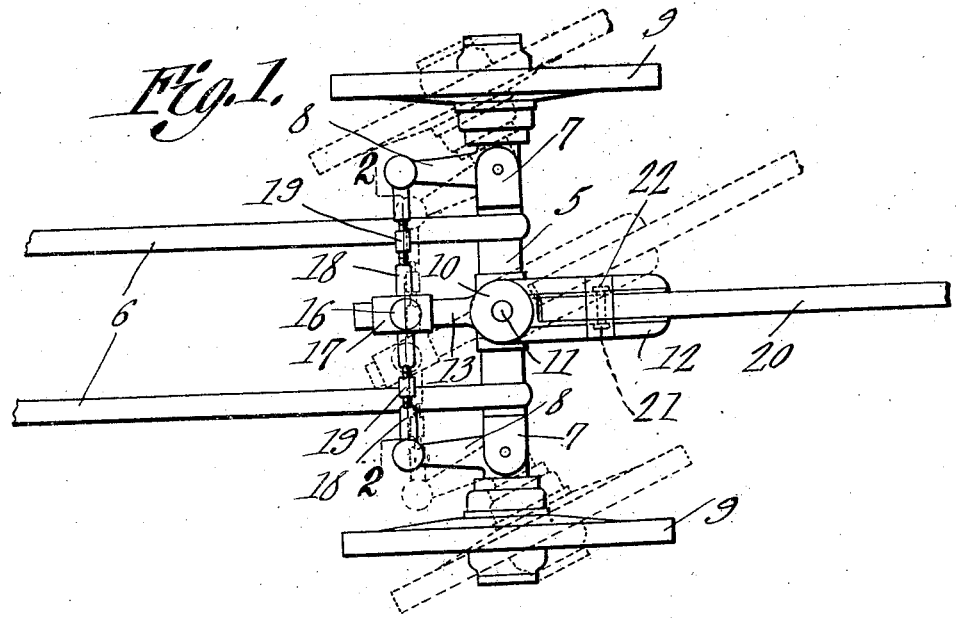
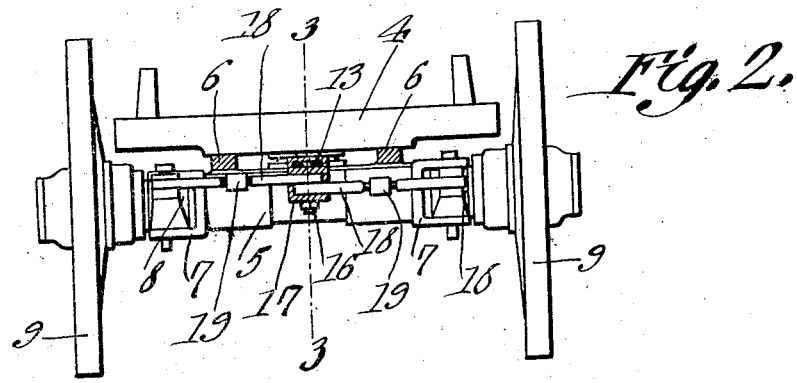
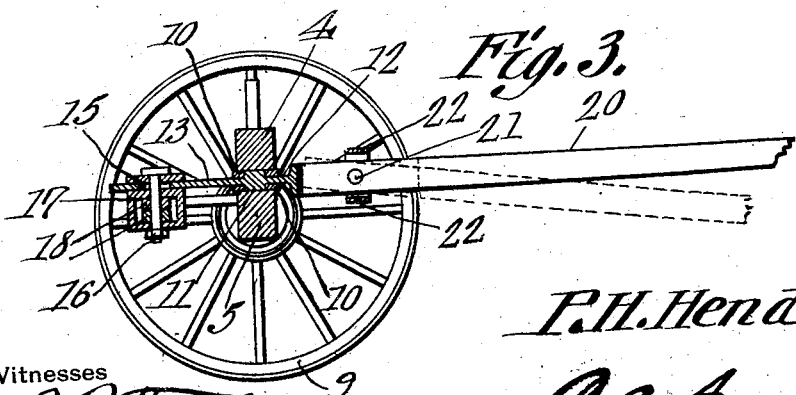
P. H. Hendrickson
Inventor

UNITED STATES PATENT OFFICE.

PETER H. HENDRICKSON, OF IONE, WASHINGTON.

WAGON STEERING-GEAR.

1,109,752.                Specification of Letters Patent.            Patented Sept. 8, 1914.

Application filed November 6, 1913.  Serial No. 799,593.

*To all whom it may concern:*

Be it known that I, PETER H. HENDRICKSON, a citizen of the United States, residing at Ione, in the county of Pend Oreille and State of Washington, have invented a new and useful Wagon Steering-Gear, of which the following is a specification.

This invention relates to improvements in steering gears for vehicles.

An object of the present invention is to provide a steering gear for vehicles which are drawn by draft animals wherein the turning of the wheels will be a function of the turning of the vehicle tongue or shafts.

A further object is to provide a vehicle steering gear wherein the turning of the front wheels is directly proportional to the turning of the shaft or tongue and the ratio therebetween may be varied at will.

A further object is to provide a vehicle to be used in connection with draft animals and to provide the front axle with steering knuckles upon which the front wheels are mounted and which are connected by means of arms or links to the tongue or shaft supporting member so that the wheels will be turned with and by the turning of the tongue or shaft.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification the preferable embodiment of my invention has been illustrated, wherein:—

Figure 1 is a top plan view of the front portion of the running gear of a vehicle. Fig. 2 is a cross sectional view taken on the line 2—2 of Fig. 1. Fig. 3 is a fragmental view in front elevation, illustrating a longitudinal section taken along the line 3—3 of Fig. 2.

Referring to the drawings in which similar reference numerals indicate corresponding elements throughout the several views, 4 designates the front bolster mounted beneath which and secured thereto is the axle 5. Extending rearwardly from the bolster and axle are the reach rods 6 which extend to the rear bolster, not shown, and which is of the usual or conventional type. The axle 5 is provided at its ends with the yokes 7 which are adapted to support the steering knuckles 8 upon which are mounted the vehicle wheels 9.

Rigidly secured to the bolster 4 and axle 5 are the annular plates 10 which are held a distance apart and which receive therein the stub shaft 11, extending from which are the arms 12 and 13. The arm 12 is bifurcated at its front end so as to receive the wagon tongue therein. The rearwardly extending arm 13 which acts as a lever is provided with a slot 15 therein and through which slot extends a bolt 16 whereby a bearing member 17 is adjustably secured and held to the arm. The bearing member 17 is, as illustrated in Fig. 3, provided with a lower compartment into which extend the links 18 which latter are pivotally held therein by the said bolt 16.

The links 18 are provided intermediate their ends with the threaded sleeve 19 whereby the lengths of the links may be shortened or lengthened at will. The links are pivotally secured at their outer extremities to the steering knuckles 8 which, as illustrated in Fig. 1, are bell crank in shape. The tongue receiving portion of the arm 12 receives the tongue 20 therein and which is pivotally secured therein by the horizontally extending pivot 21. The tongue is thus adapted to swing upwardly or downwardly and is limited in its pivotal motion by the stops 22 which however do not interfere with the normal motion imparted to the tongue by the movements of the draft animals.

In operation, sleeve 19 may be adjusted so as to properly position the wheels 9 and hold them in such relation. The bearing 17 may be shifted longitudinally of the arm 13 so as to vary the length of the lever arm thereof which will therefore vary the ratio between the turning of the tongue 20 and the corresponding movement of the wheels 9. Thus it will be apparent that the wagon can be adjusted to suit the actions or characteristics of the draft animals which are secured to the vehicle. Thus it will be apparent that if it is found that the draft animal is slow in turning, the lever arm may be lengthened so that the wagon will turn quickly for small turnings of the tongue 20. If, however, on the contrary it is found that the draft animal has a tendency to turn to too great an extent the lever arm of the bearing member 17 may be shortened by moving said bearing toward the stub shaft so that the ratio between the turning of the tongue and the wheels will be correspondingly lessened.

Having thus fully described my invention, what I claim is:—

1. In an apparatus of the class described, the combination of a vehicle axle, steering knuckles pivotally secured to the outer extremities thereof and having wheels thereon, and an arm pivotally secured to the vehicle axle, a tongue connected to the said arm adapted to rotate the same, and means for transmitting motion from the said arm to the steering knuckles, the said means adjustable longitudinally of the arm to vary and adjust the lever arm thereof.

2. In an apparatus of the class described, the combination with a vehicle axle, steering knuckles and wheels carried thereby, of a wagon tongue carrying member pivotally supported by the said axle, an arm projecting therefrom, a member slidably secured to the said arm adapted to shift longitudinally thereof and means for locking it in any desired position, and links pivotally secured to the said member and to the steering knuckles adapted to impart motion thereto at varying velocity ratios with respect to the movements of the wagon tongue.

3. The combination with a vehicle axle, steering knuckles, and wheels carried thereby, of an arm rotatably supported by the said vehicle axle, a tongue receiving member secured to the said arm and adapted to impart limited rotation thereto, said arm provided with a slot extending longitudinally thereof, a member slidably engaging the said arm, a bolt extending through the said bearing member, through the arm slot, and adapted to lock the bearing member at adjusted positions thereon, links pivotally secured to the said bearing member bolt and to the steering knuckles adapted to impart motion thereto at varying velocity ratios taken with respect to movements of the arm to thereby vary the turning of the wheels with corresponding turning of the wagon tongue.

In testimony that I claim the foregoing as my own, I have hereto affixed my signature in the presence of two witnesses.

PETER H. HENDRICKSON.

Witnesses:
  TONEY LEIDINGER,
  PAUL A. WEBB.